(12) United States Patent
Blatter et al.

(10) Patent No.: US 6,261,690 B1
(45) Date of Patent: Jul. 17, 2001

(54) SPHERICAL COLORED POLYESTER PARTICLES, PROCESS FOR THEIR PREPARATION, AND THEIR USE FOR POWDER COATINGS

(75) Inventors: Karsten Blatter, Erftstadt; Peter Simon, Eppstein, both of (DE)

(73) Assignee: Aventis REsearch & Technology GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/367,475

(22) PCT Filed: Feb. 11, 1998

(86) PCT No.: PCT/EP98/00748

§ 371 Date: Aug. 13, 1999

§ 102(e) Date: Aug. 13, 1999

(87) PCT Pub. No.: WO98/36011

PCT Pub. Date: Aug. 20, 1998

(30) Foreign Application Priority Data

Feb. 17, 1997 (DE) ............................... 197 05 962

(51) Int. Cl.⁷ ............................. B32B 15/02; C08G 63/02
(52) U.S. Cl. ..................... 428/402; 528/272; 528/481; 528/491; 528/503; 524/700; 524/730
(58) Field of Search .................... 528/481, 272, 528/491, 503; 524/700, 730; 428/402

(56) References Cited

U.S. PATENT DOCUMENTS

| | | | |
|---|---|---|---|
| 3,985,700 | * 10/1976 | Nicks et al. | |
| 4,920,008 | 4/1990 | Barbee et al. | |
| 4,988,793 | 1/1991 | Barbee et al. | |
| 5,028,682 | 7/1991 | Witzemann et al. | |
| 5,312,704 | 5/1994 | Fuller et al. | |
| 5,736,621 | * 4/1998 | Simon et al. | 528/271 |

FOREIGN PATENT DOCUMENTS

| | | |
|---|---|---|
| 403868A1 | 6/1992 | (DE) . |
| 0751166A2 | 1/1997 | (EP) . |
| 2223351 | 10/1975 | (FR) . |
| WO 92/07913 | 5/1992 | (WO) . |

OTHER PUBLICATIONS

Japanese Abstract No. JP 06016819–A dated Jul. 2, 1992.
Japanese Abstract No. JP–0601680–A dated Jul. 1, 1992.
Japanese Abstract No. JP–06016821–A dated Jul. 2, 1992.
Japanese Abstract No. JP–05097980–A dated Oct. 11, 1991.
Japanese Abstract No. JP–05097982–A dated Oct. 4, 1994.
Turska et al., Polycondensation in the Gel Phase, Acta Chim. Acad. Sci. Hung, 1974, pp. 373–84 (abstract).
Japanese Abstract No. JP 06263882 dated Sept. 20, 1994.

* cited by examiner

*Primary Examiner*—Samuel A. Acquah
(74) *Attorney, Agent, or Firm*—Frommer Lawrence & Haug LLP

(57) ABSTRACT

The invention relates to homogeneously colored polyester particles having a mean particle size $<50$ $\mu$m and a monomodal particle size distribution with a span $(=d90-d10/d50)$ $\leq 2.5$, which can be melted at temperatures $<200°$ C. to form a continuous coating, to a process for their preparation and to their use for powder coatings.

In a preferred embodiment the particles comprise units of formulae (1) and (2)

$$-\text{CO}-\text{X}-\text{CO}- \quad (1)$$

$$-\text{O}-\text{D}-\text{O}- \quad (2)$$

where
X is a substituted or unsubstituted $C_6$ to $C_{14}$ aromatic radical or an alkylene, polymethylene, cycloalkane or dimethylene-cycloalkane group or a straight-chain or branched, saturated or unsaturated alkanediyl group and D is an alkylene, polymethylene, cycloalkane or dimethylene-cycloalkane group or a straight-chain or branched, saturated or unsaturated alkanediyl group.

20 Claims, No Drawings

SPHERICAL COLORED POLYESTER PARTICLES, PROCESS FOR THEIR PREPARATION, AND THEIR USE FOR POWDER COATINGS

The present invention relates to homogeneously colored, spherical polyester particles having particle sizes <50 μm, which form a continuous coating at temperatures <200° C., to a process for their preparation and to their use as powder coatings.

Powder coatings consist in general of a film-forming polymer which may be crosslinkable, of additives such as, for example, flow improvers or devolatizing auxiliaries, and, in the case of colored powder coatings, of pigments and, if desired, fillers.

Powder coatings are traditionally prepared by subjecting the abovementioned components to intensive mixing in an extruder at a temperature above the softening temperature of the film-forming polymer but below the crosslinking temperature and then, by means of a milling process, bringing the resulting extrudate to a mean particle size of from about 40 to 70 μm. The milling process leads to powders of irregular structure, which means that powders having a mean particle size of markedly less than 30 μm can no longer be processed by the electrostatic spray techniques customary in the processing of powder coatings. For example, EP-A-0 459 048 mentions that powder coating compositions having a particle size of less than 15 μm cannot be processed by the electrostatic spray technique.

The milled powders used in the prior art have a mean particle diameter of from about 40 to 70 μm and lead typically to a coat thickness of from 40 to 70 μm. The milling technology produces, in particular, a very broad particle size distribution. In addition, a broadening of this distribution is observed with increasing fineness of the powders.

The breadth of a particle size distribution is characterized using not only the parameter d50, for which just 50% of the particles are greater than or smaller than the value d50, but also two further parameters: d10 designates the particle size for which 10% of the particles are smaller than this limit value. Correspondingly, d90 designates the particle size to which 90% of the particles are finer than the value d90. The breadth of a particle size distribution generally characterized by forming a quotient which is referred to as the span and is calculated in accordance with the following formula: span=d90–d10/d50. The relationship is thus: the smaller the span the narrower the particle size distribution. A powder comprising spheres identical in size would have a span of 0. For milled powders of the prior art, with a mean particle size d50 of 50 μm, a span of 3–4 is typically obtained.

On the basis of economic considerations (lower material consumption) but also because of technical advantages (greater flexibility of the coating) a relatively low coat thickness is desirable for powder coatings. A relatively low coat thickness can be realized only by reducing the particle size of the powder. Another critical factor is that the powders have a very narrow particle size distribution, since otherwise there are difficulties in processing, especially with a high fines content.

There has therefore been no lack of attempts in the past to obtain a reduction in the particle size of powder coatings by means of new technologies without incurring the abovementioned disadvantages in powder processability. The aim is, in general, to prepare particles with a near-ideal spherical form, since such powders exhibit substantially more favorable flow behaviour than the irregular milled powders. It has been attempted, for example, to prepare near-spherical particles by spraying polymer melts. The results presented in WO 92/00342 indicate, however, that this leads only to moderate success. The particles obtained by this technique, although having a smoother surface than milled powders, are still far removed from the ideal structure of a sphere.

Another method which has been investigated for the preparation of spherical particles the spraying of polymers from a supercritical solution, as described, for example, in EP-A-0 661 091 or EP-A-0 792 999. This method too has substantial disadvantages. For example, in the cited applications it is stated that, owing to the sudden evaporation of the supercritical "solvent", a powder is obtained which has a porous structure. If these powders are employed to prepared films there is—in comparison with nonporous powders—an increased occurrence of bubble formation and thus of defects in the coating, since the porous structure means that a large amount of gas is trapped in the powder and must be removed in the course of the process of film formation. The use of supercritical solvents, moreover, is technically complex since, for example, it requires operation under high pressures.

A method of producing spherical particles which differs in its principle is the production of a dispersion. Physical laws mean that in a dispersion the perfect spherical form is the preferred geometry of the particles obtained. Under appropriate conditions it is possible to prepare spherical particles having a very narrow particle size distribution.

There has therefore been no lack of attempts in the past to obtain polymer particles which can be used as binders in coating systems, preferably in high-solids liquid coating systems, by preparing them in dispersion (Keith Barett, Dispersion Polymerization in Organic Media, John Wiley & Sons, London, 1975). GB-1 373 531, for example, describes the preparation of stable dispersions of polycondensation polymers, such as polyesters.

The possibility of using the polymer particles from nonaqueous dispersion processes based in particular on polyesters, as a powder coating is addressed in DE-C-21 52515. Here, an existing polymer is brought into dispersion at a temperature <200° C. and coloration is obtained by adding pigments, preferably after the dispersion has been cooled to below the "solidification point" of the polymer particles. The resulting particles are described as substantially spherical "aggregates" of primary polymer particles, having a particle size of from 0.05 to 20 μm, and pigment articles. The aggregates, described as secondary particles, have a particle size of from 10 to 90 μm or from 100 to 300 μm and are obtained by spraying the dispersion. In the process described, pigments are added at room temperature or only slightly elevated temperature, which means that the pigment particles are attached only loosely to the polymer particles; experience has shown this to lead to problems in connection with the processing of the powder, since separation of the pigments from the polymer binder takes place. The possibility of adding pigments at a relatively high temperature prior to solidification of the binder is described as difficult and not preferable, because there may be a change in the particle size.

In addition, no methods are indicated of how powder coating systems can be prepared which crosslink at the desired low temperatures of between 120 and 200° C. The crosslinking systems mentioned all have a crosslinking temperature which is above the temperature required for dispersing.

The use, as described in DE-C-21 52 515, of a polymer which has already been condensed to high molecular weights as a starting product for dispersion preparation, moreover, has the following disadvantages: the already considerable viscosity of the polymers, which in the case of the commercially used polymers is in the range from 3000 to 20,000 mPas (at 200° C.) makes it difficult to achieve good division of the melt and to obtain a homogeneous particle size distribution.

The object of the present invention, consequently, is to provide homogeneously colored, spherical polyester particles, having a very low particle size and a narrow particle size distribution, with which there is no separation of the pigments from the polymeric binder in the course of powder processing, and which can be processed and, if desired, crosslinked even at low temperatures to form a continuous coating and are therefore suitable for use as powder coatings.

The present invention achieves this object and provides homogeneously colored, spherical, nonporous polyester particles which can be crosslinked as desired, having a mean particle size of <50 μm and a monomodal particle size distribution (d90–d10/d50)≦2.5, which can be melted at temperatures <200° C. to form a continuous coating.

The novel, homogeneously colored, spherical polyester particles which can be crosslinked if desired are prepared by a. dispersing the starting materials for a polyester binder in an inert high-boiling heat transfer medium at a temperature which is at least as high as the softening temperature of the starting materials, in the presence of at least one polymeric, preferably organic, dispersion stabilizer, and b. then heating the reaction mixture to a temperature in the range from 120 to 280° C., with simultaneous removal of the condensation byproducts, until the polyester has the desired molecular weight;

c. subsequently, in the temperature range in the range from 140 to 220° C., adding dyes, pigments and/or fillers and also, if desired, further additives;

d. thereafter cooling the reaction mixture, in the case of a crosslinkable functional polyester, to a temperature in the range from 60 to 140° C. and adding at least one polyfunctional crosslinking agent or epoxy resin, and e. subsequently reducing the temperature to within a range which is below the softening temperature of the polyester and separating off the resulting homogeneously colored, spherical polyester particles.

The starting materials employed are preferably oligoesters having a viscosity of less than 1000 mPas (measured at 200° C.), in particular ≦500 mPas, which comprise units of the formulae (1) and (2)

—CO—X—CO  (1)

—O—D—O—,  (2)

where

X is a substituted unsubstituted $C_6$ to $C_{14}$ aromatic radical or an alkylene, polymethylene, cycloalkane or dimethylenecycloalkane group or a straight-chain or branched, saturated or unsaturated alkanediyl group and D is an alkylene, polymethylene, cycloalkane or dimethylene-cycloalkane group or a straight-chain or branched, saturated or unsaturated alkanediyl group.

To save time it is preferred first of all to prepare oligoesters of the above-described composition in the melt by heating the carboxylic acid components, such as terephthalic, isophthalic, adipic or fumaric acid to name but a few, in the form of the acid or as low molecular mass alkyl esters, together with the diol components, for example ethylene glycol, diethylene glycol, neopentylglycol or bis-hydroxymethylcyclohexane, in the melt in the presence of a transesterification catalyst, such as manganese acetate or zinc salts or tin salts, until the majority of the condensation products water or the lower alkanols, respectively, has been distilled off. In the course of this operation, however, no significant increase is observed in the viscosity of the melt. At 200° C. the viscosity is still <1000 mPas.

An oligomer mixture of this kind can be converted, for example, into a novel dispersion directly at elevated temperature by combination with heat transfer oil and dispersant. This method is preferred for large-scale industrial preparation. However, it is also possible to cool the oligomer mixture for the purpose of storage and to heat it up again later. In general, it is also possible to carry out the preparation of the oligomers in the actual dispersion.

In a practical embodiment of the novel process the starting materials, preferably as an oligomer mixture, are mixed in step (a) in an inert, high-boiling heat transfer medium, the mixture is heated to an elevated temperature which must lie above the softening temperature of the starting materials, judiciously in the range from 150 to 280° C., and then at least one dispersion stabilizer or a dispersion stabilizer mixture is incorporated by stirring.

Heat transfer media (dispersion media) which have proven particularly appropriate are aliphatic heat transfer oils having a boiling point in the range from 150 to 300° C. Such heat transfer oils are—in the technical sense—free from aromatic structural groups; in other words, they contain not more than 2% by weight, preferably not more than 1% by weight, of aromatic constituents.

Owing to the low polarity of these oils, which are marketed, for example, by Exxon Chemical under the trade names ®Isopar, ®Exxsol or ®Norpar, the polyesters are not swollen. This is a problem which occurs in some cases for aromatic oils, which in principle are equally suitable for the dispersion process.

General rules for the design of appropriate polymeric dispersion stabilizers are given in "Keith Barett, Dispersion Polymerization in Organic Media, John Wiley & Sons, London, 1975" on pages 45 to 110. Principal requirements are solubility of the polymeric dispersion stabilizer in the dispersion medium used, and polar or reactive groups which allow strong interaction with the particles that are to be dispersed.

For the novel process it is preferred to employ amphiphilic copolymers or surface-modified inorganic compounds. Examples of the latter are phyllosilicates surface-modified with trialkylammonium salts, especially bentonite surface-modified with trialkylammonium salts, or amphiphilic copolymers comprising a polar polymer unit, for example poly-N-vinyl pyrrolidone, and an apolar polymer unit, for example long-chain α-olefins such as 1-eicosene.

Such amphiphilic copolymers are marketed by the company ISP Global under the tradename ®Antaron and have been found particularly appropriate. As described, for example, in EP-B-0 392 285, Antaron has already been employed successfully at relatively low temperatures for stabilizing polyurethane dispersions. It has been found that Antaron can also be employed with advantage, however, at temperatures up to 300° C. and results in excellent stability of the dispersions.

The content of dispersion stabilizer is, in accordance with the invention, in the range from 0.1 to 6% by weight based on the polyester starting materials, preferably in the range from 0.3 to 4% by weight and, in particular, in the range from 0.5 to 2% by weight in order to obtain particles having the desired size.

In a subsequent step (b) the reaction mixture is heated further to a temperature in the range from 120 to 280° C., in particular from 200 to 250° C., with the resulting condensation byproducts being removed in parallel. The temperature is maintained until the polyester has reached the desired molecular weight, which is usually within the range of Mn=500 to 20,000, preferably in the range from 1000 to 10,000. Of decisive importance for the molecular weight is the duration of the reaction, which can be monitored by taking samples.

In order to increase the functionality of the polyester it is possible, for crosslinkable systems after the required molecular weight has been reached, to add polyfunctional components subsequent to step (b). For example, polyfunctional carboxylic acids or alcohols, for example trimellitic anhydride, are added at the same reaction temperature, and heating is continued for a while in order to ensure that the components added are incorporated.

Following the conclusion of the condensation in step (b) it is also possible, in order to optimize the coating properties of the polyester—as is desirable for optimum surface quality of the powder coat finishes—to add additives such as flow assistants or devolatilization assistants, for example. This is done by cooling the mixture to 160 to 200° C. and adding the desired additives at the same time as stirring the reaction mixture. The addition of the additives can either be made separately or combined with the addition of the dyes and pigments.

The additives which are customary in powder coating technology, such as flow improvers or antifoams, can be added as described above without impacting negatively on the dispersion stability or the particle formulation.

Subsequent to (c), at a temperature markedly above the softening point of the polyester, preferably in the range from 140° C. to 220° C., fillers, for example calcium carbonate, barium sulfate, titanium dioxide, mica, talc, dolomite or wollastonite, and dyes and/or pigments for coloring the polyester particles, are added.

To establish the color it is possible to employ all customary commercial organic or inorganic pigments or dyes which are temperature-stable up to at least 200° C. or up to the curing temperature of the powder coating system. Dyes or pigments which meet said requirements are listed, for example, in "David A. Bate, "The science of powder coatings" Volume 1, SITA Technology, ISBN 0 947798005. If desired, it is also possible to employ mixtures of different pigments or dyes in order to establish the color.

In an embodiment which is preferred in accordance with the invention the dyes, pigments and/or fillers, before being added to the reaction mixture, are dispersed in the presence of amounts of dispersion stabilizer which are sufficient for dispersion, preferably in the heat transfer medium used, and the dispersion is preheated to the temperature of reaction mixture. In this way it is possible to achieve highly homogeneous and intensive coloration of the polyester particles which is retained even if the powders are processed further.

The reaction mixture is subsequently cooled to a temperature in the range from 60 to 140° C., in particular from 80 to 120° C., and, in the case of a crosslinkable functional polyester, at least one polyfunctional crosslinking agent or an epoxy resin is added. By this method it is possible to avoid the crosslinking reaction to the extent that the coatings obtained from the powders have the customary gel times of from 2 to 5 minutes at the baking temperature (e.g. 180° C.).

The novel powder coatings therefore are no different in terms of baking temperatures and gel times from conventional systems obtained by extrusion and milling.

The novel polyesters can both exhibit thermoplastic behavior and contain functional groups which are subsequently crosslinkable.

The carboxyl groups of functional polyesters can thus be crosslinked, for example, with epoxides. Examples of customary compositions of such polyesters are given in the following monograph: "David A. Bate, "The science of powder coatings" Volume 1, SITA Technology, ISBN 0 947798005, to which explicit reference is hereby made. Examples of typical raw materials which can be used for functional polyesters are the following dicarboxylic acids, or their low molecular mass esters: terephthalic, isophthalic, adipic, sebacic, phthalic and fumaric acid. Examples of diol components which can be employed are ethylene glycol, diethylene glycol, neopentylglycol, hexanediol, and bishydroxymethylcyclohexane.

A review of customary crosslinking agents for functional polyesters and of required additives, for example flow improvers, is given in the abovementioned literature reference. Examples of typical crosslinkers are triglycidyl isocyanurate (®Araldite PT 810), epoxy resins based on bisglycidyl-bisphenol A, or else β-hydroxyalkylamides (e.g. ®Primid XL 552).

The content of crosslinking agent is usually from 2 to 20% by weight, preferably from 5 to 10% by weight, based on the polyester component, but for so-called epoxy/polyester hybrid systems can rise to up to 50% by weight.

Following the addition of the crosslinking agent, the temperature of the reaction mixture is reduced to a temperature which is below the softening temperature of Polyester, preferably <60° C.

In this process the polyester is obtained in powder form. The resulting homogenously colored, spherical polyester particles are separated off from the supernatant reaction solution and are purified if desired.

The polyester particles obtained by the process described are transparent and can be prepared with any desired molecular weight, for example in the range from Mn=500 to Mn=50,000. The yield is >95%, in general even greater than >98%, especially if the reaction is conducted on a relatively large scale. There are virtually no instances of adhesion in the reactor which would lead to a reduction in the yield.

By means of the novel process it is possible to obtain homogeneously colored, spherical polyester particles having a mean particle size (d50)<50 μm, preferably <40 μm, and in particular <30 μm, and a monomodal particle size distribution (d90–d10/d50) of ≦2.5, in particular ≦2.0 and, preferably, ≦1.5.

The polyester particles obtained are also notable for the fact that after application to an appropriate surface they can be melted at temperatures below 200° C., in particular at temperatures in the range from 120 to 200° C., preferably from 160 to 200° C., to form a continuous coating, which in the case of crosslinkable polyesters can also be cured at these temperatures.

Because of their narrow particle size distribution the novel spherical polymer particles are extremely suitable for processing by the customary techniques of powder coating technology, and give rise to homogeneously coloured coatings having a very good surface. In comparison with the known powders, when the novel polyester powders are processed to powder coat finishes there is no separation of the pigment particles from the polymer particles. The coatings produced in this way therefore feature a highly homogeneous, uniform coloration and an excellent hiding power. In comparison with conventional powders, which usually give a coat thickness of from 50 to 70 μm, it is possible using the polyester powders described herein to produce coats having thicknesses <50 μm, preferably coatings having thicknesses in the range from 5 to 40 μm, in particular from 10 to 35 μm.

The examples which follow are intended to illustrate the invention.

EXAMPLES

Example 1

Preparing an Oligomer Mixture as Starting Material for the Preparation of a Crosslinking Polyester Powder Coating 4090 g of dimethyl terephthalate (21.06 mol), 888.4 g of dimethyl isophthalate (4.58 mol), 2814 g of neopentylglycol (27.05 mol) and 1.5 g of manganese(II) acetate tetrahydrate as catalyst are weighed out into a 10 l four-necked round-bottomed flask. The flask is connected to a packed column (l=10 cm) fitted with distillation attachment. The reaction mixture is then brought to 150° C. under inert gas. At this temperature, all of the monomers are in melt form. Furthermore, at this temperature esterification begins. The temperature is controlled so that the overhead temperature does not exceed 75° C. The internal temperature is raised from 150° C. to 225° C. over the course of 4 h in order to remove from the reaction mixture as much as possible of the methanol that is formed.

6181.1 g of oligomer mixture and 1448.8 g of methanol (theoretical: 1640 g of methanol) are isolated.

Example 2

Preparing an Oligomer Mixture for Thermoplastic Polyesters 2475 g of dimethyl terephthalate (12.75 mol), 2250 g of dimethyl isophthalate (11.59 mol), 450 g of neopentylglycol (4.33 mol), 2500 g of ethylene glycol (40.28 mol), 252 g of diethylene glycol (2.37 mol) and 1.485 g of manganese(II) acetate tetrahydrate are weighed out into a 10 l four-necked round-bottomed flask.

Under inert gas, the reaction mixture is heated to a temperature of 150° C. At this temperature, all of the monomers have melted. The methanol formed is distilled off via a packed column (l=10 cm) with distillation bridge. The temperature is controlled so that the overhead temperature does not exceed 75° C. The reaction mixture is heated to a temperature of 225° C. in order to remove as much as possible of the methanol from the reaction mixture. 1555 g of methanol (theoretically 1557 g) were distilled off. Cooling to room temperature gave 6240 g of highly viscous oligomer mixture.

Example 3

Preparing Colored, Crosslinkable Powder Coatings 225 g of the oligomer mixture prepared in Example 1, 180 g of Isopar P and 45 g of Isopar L as heat transfer oil, 88 mg of antimony trioxide as esterification catalyst, and the amount of Antaron V 220 (ISP Global) indicated in Table 1, as dispersant (Antaron 1), are weighed out into a 1 l reactor with water separator, and the mixture is heated under inert gas. As soon as all the components have melted (internal temperature about 150° C.) the stirrer is switched on and the mixture is heated with vigorous stirring to the boiling temperature of the heat transfer oil (about 230° C.). The reaction mixture is held at this temperature for 1 h, during which small amounts of methanol and neopentylglycol are distilled off. Then 16.5 g of trimellitic anhydride are added and the mixture is held at boiling for a further 30 minutes. A few ml of distillate are obtained.

Subsequently, the heating bath is removed and the dispersion is allowed to cool slowly. When the internal temperature is in the range between 200 and 160° C., a dispersion is added which has been prepared beforehand, preheated to the same temperature and comprises the amounts given in Table 1 of dye, pigment and dispersant (Antaron 2) and of the auxiliaries ®BYK 360 P (3.4 g, BYK Chemie) as flow improver and 0.9 g of benzoin as devolatilizing auxiliary, in Isopar L. This dispersion is obtained by heating all the components to about 100° C. under vigorous shearing conditions.

The mixture is subsequently allowed to cool to a temperature of 100 to 120° C. and, within this temperature range, 15.7 g of triglycidyl isocyanurate (TGIC) are added. After cooling to room temperature, the powder is isolated by filtration, washing with low-boiling hydrocarbons and drying. Highly free-flowing, spherical powders are obtained which have the particle sizes stated in Table 1 and which can be processed by the customary electrostatic spray techniques to give powder coat finishes. Curing at 180° C. for 20 minutes gives coatings having good adhesion and excellent surface quality. The film thicknesses obtained are listed in Table 1.

TABLE 1

| No. | Antaron 1 [g] | Antaron 2 [g] | Filler | Pigment | Isopar L [g] | Particle size (d50, μ) | Span | Film thickness of the coating [μ] |
|---|---|---|---|---|---|---|---|---|
| 1 | 4.5 | 4.0 | 150 g Barium sulfate | 21.5 g PV Fast Red | 171 | 32 | 2.4 | 24 |
| 2 | 4.5 | 4.5 | 157 g Calcium carbonate | 22 g PV Fast Red | 180 | 28 | 2.0 | 22 |
| 3 | 4.5 | 0.75 | 33 g Calcium carbonate | 7.5 g PV Fast Red | 65 | 40 | 2.3 | 29 |
| 4 | 4.5 | 4.0 | 150 g Barium sulfate | 22 g PV Fast Blue | 170 | 29 | 1.7 | 21 |
| 5 | 3.5 | 0.75 | 33 g Calcium carbonate | 7.5 g PV Fast Blue | 65 | 41 | 1.4 | 30 |
| 6 | 3.5 | 0.75 | 33 g Barium sulfate | 7.5 g PV Fast Blue | 65 | 35 | 1.3 | 26 |

TABLE 1-continued

| No. | Antaron 1 [g] | Antaron 2 [g] | Filler | Pigment | Isopar L [g] | Particle size (d50, μ) | Span | Film thickness of the coating [μ] |
|---|---|---|---|---|---|---|---|---|
| 7 | 3.5 | 0.75 | 33 g Calcium carbonate | 7.5 g Fast Yellow | 65 | 41 | 1.9 | 32 |

Example 4

Preparing Thermoplastic Powder Coatings 300 g of oligomer mixture from Example 3, 150 g of Isopar P and 150 g of Isopar L as heat transfer oils, and also Antaron V 220 (amounts see Table 2) as dispersion stabilizer and 100 mg of antimony trioxide as esterification catalyst are weighed out into a 1 l reactor with water separator. The reactor is connected to a water separator. The reaction mixture is subsequently heated with vigorous stirring to an internal temperature of 217° C. (beginning of boiling of heat transfer oil). Distillation begins at about 20° C. below the boiling point of the heat transfer medium (t=0 min). Distillation is continued for 4 h at an internal temperature of 217 to 218° C. During this time, about 82 ml of a mixture of ethylene glycol, neopentylglycol and diethylene glycol are distilled off by azeotropic distillation with the heat transfer medium. The majority of the distillate consists of ethylene glycol. Then the heat bath is removed and the mixture is allowed to cool with stirring. In the temperature range between 200 and 160° C. the amounts of pigment or dye indicated in Table 2, dispersed in a little Isopar L, are added. The mixture is cooled further to room temperature with stirring.

The polyester powder is separated from the heat transfer oil by filtration. To remove adhering heat transfer oil, the polyester particles are washed three times with isohexane and then dried at 30° C./0.1 mbar for 3 h. Colored, spherical particles are obtained which have the mean particle sizes and particle size distributions stated in Table 2. The yield of powder is between 95 and 98% of theory.

TABLE 2

| No. | Amount of Antaron [g] | Pigment (P)/ Dye (F) | Mean particle size (d50) [μ] | Span of the particle size distribution | Film-thickness [μ] |
|---|---|---|---|---|---|
| 1 | 3.0 | (P) Hostaperm* Violet RI (3.2 g) | 19 | 2.0 | 15 |
| 2 | 3.0 | (F)Hostasol Red* GG (2.4 g) | 44 | 2.4 | 35 |
| 3 | 2.3 | (P) PV Fast Yellow HGR* (3.6 g) | 12 | 1.9 | 15 |
| 4 | 2.3 | (P) PV Fast Yellow HGR* (11.8 g) | 32 | 1.3 | 24 |
| 5 | 2.3 | (P) PV Fast Blue A2R* (11.8 g) | 34 | 1.3 | 26 |
| 6 | 2.3 | (F) Polysynthren Blue* (2.3 g) | 36 | 2.4 | 28 |

The powders were sprayed electrostatically onto metallic surfaces and were melted at 180° C. for 10 minutes. Homogeneous, well-adhering coatings of excellent surface quality are obtained. The coat thicknesses are listed in Table 2.

What is claimed is:

1. Polyester particles having a mean particle size <50 μm, which are homogeneously colored and spherical, have a monomodal particle size distribution with a span (=d90–d10/d50)≦2.5 and which after melting at temperatures <200° C. form a continuous coating.

2. Polyester particles as claimed in claim 1, which have a molecular weight Mn in the range from 500 to 50,000.

3. Polyester particles as claimed in claim 1, which have a monomodal particle size distribution with a span (=d90–d10/d50)≦2.0.

4. Polyester particles as claimed in claim 1, wherein the coating has a thickness in the range <50 μm.

5. Polyester particles as claimed in claim 1, which comprise units of the formulae (1) and (2)

—CO—X—CO—                   (1)

—O—D—O—,                     (2)

where

X is a substituted or unsubstituted $C_6$ to $C_{14}$ aromatic radical or an alkylene, polymethylene, cycloalkane or dimethylene-cycloalkane group or a straight-chain or branched, saturated or unsaturated alkanediyl group and D is a n alkylene, polymethylene, cycloalkane or dimethylene-cycloalkane group or a straight-chain or branched, saturated or unsaturated alkanediyl group.

6. A process for preparing spherical, homogeneously colored polyester particles having a span (d90–d10/d50) >2.5 by a. dispersion of the starting materials for a polyester binder in an inert high-boiling heat transfer medium which contains at most 2% by weight of aromatic components at a temperature which is at least as high as the softening temperature of the starting materials, in the presence of at least one polymeric dispersion stabilizer which is an amphiphilic copolymer or a surface-modified inorganic compound, and b. then heating of the reaction mixture to a temperature in the range from 120° to 280° C., with simultaneous removal of the condensation byproducts, until the polyester has molecular weight in the range from 500 to 20,000;

c. subsequent addition of fillers, dyes and/or pigments and, if desired, further additives at a temperature in the range from 140° to 220°;

d. in the case of crosslinkable functional polyesters, subsequent cooling of the reaction mixture to a temperature in the range from 60 to 140° C. and addition of least on polyfunctional crosslinking agent or epoxy resin, and e. further reduction of the temperature to within a range which is below the softening temperature of the polyester and separating off of the resulting spherical homogeneously colored polyester particles.

7. The process as claimed in claim 6, wherein as starting materials compounds are employed which comprise units of the formulae (1) and (2)

—CO—X—CO                     (1)

—O—D—O—                     (2)

where

X is a substituted or unsubstituted $C_6$ to $C_{14}$ aromatic radical or an alkylene, polymethylene, cycloalkane or dimethylene-cycloalkane group or a straight-chain or branched, saturated or unsaturated alkanediyl group and D is an alkylene, polymethylene, cycloalkane or dimethylene-cycloalkane group or a straight-chain or branched, saturated or unsaturated alkanediyl group.

8. The process as claimed in claim 6, wherein the starting materials are heated in step (a.) to a temperature in the range from 150 to 280° C.

9. The process as claimed in claim 6, wherein the heat transfer medium used has a boiling point in the range from 150 to 300° C.

10. The process as claimed in claim 6, wherein the content of crosslinking agent is in the range from 5 to 20% by weight, based on the starting materials.

11. The process as claimed in claim 6, wherein the fillers, dyes or pigments, prior to addition, are dispersed in step (c) in the heat transfer medium used, in the presence of a dispersion stabilizer, and this dispersion is preheated to the temperature of the reaction mixture.

12. The process as claimed in claim 7, wherein the dyes or pigments added in step (c) are temperature-stable up to at least 200° C.

13. The process as claimed in claim 7, wherein an amphiphilic copolymer is employed as dispersion stabilizer.

14. The process as claimed in claim 6, wherein the dispersion stabilizer is poly(vinyl) pyrrolidone/1-eicosene.

15. The process as claimed in claim 7, wherein subsequent to step (b) and after the required molecular weight has been reached, polyfunctional components are added to increase the functionality of the polyester.

16. The process as claimed in claim 6 wherein, following the conclusion of the condensation in step (b), the reaction mixture is cooled to 160° C. to 200° C. additives are added in order to optimize the coating properties of the polyester.

17. The process as claimed in claim 6, wherein the polyesters obtained have a molecular weight Mn in the range from 500 to 50,000.

18. The process as claimed in claim 6, wherein the polyester particles are obtained in powder form.

19. The process as claimed in claim 6, wherein the polyester particles obtained have a monomodal particle size distribution with a span (d90–d10/d50) of $\leq 2.5$.

20. Spherical, homogeneously colored polyester particles having a mean particle size <50 µm, which have been prepared by the process claim 6.

* * * * *

UNITED STATES PATENT AND TRADEMARK OFFICE
CERTIFICATE OF CORRECTION

PATENT NO.    : 6,261,690 B1                                              Page 1 of 1
DATED         : July 17, 2001
INVENTOR(S)   : Karsten Blatter and Peter Simon It is certified that error appears in the above-identified patent and that said Letters Patent is hereby corrected as shown below:

<u>Title page,</u>
Item [73], please delete "Aventis Research & Technolgy GmbH & Co. KG" as the assignee and replace it with -- DuPont Performance Coatings GmbH & Co. KG --.

Signed and Sealed this

Fifteenth Day of April, 2003

JAMES E. ROGAN
*Director of the United States Patent and Trademark Office*